United States Patent [19]

Evans

[11] Patent Number: 5,274,749
[45] Date of Patent: Dec. 28, 1993

[54] INTERPRETATIVE SYSTEM FOR SYSTEMATIC LEARNING AND SUPPORT FOR DECISION-MAKING

[75] Inventor: Steven Evans, Omaha, Nebr.

[73] Assignee: Health Care Expert Systems, Inc., Omaha, Nebr.

[21] Appl. No.: 772,599

[22] Filed: Oct. 8, 1991

Related U.S. Application Data

[63] Continuation of Ser. No. 453,261, Dec. 21, 1989, abandoned, which is a continuation of Ser. No. 361,768, May 30, 1989, abandoned, which is a continuation of Ser. No. 135,466, Dec. 21, 1987, abandoned, which is a continuation of Ser. No. 23,989, Mar. 12, 1987, abandoned, which is a continuation of Ser. No. 643,548, Aug. 23, 1984, abandoned.

[51] Int. Cl.$^5$ .............................................. G05B 19/00
[52] U.S. Cl. ....................................... 395/63; 395/51; 395/934
[58] Field of Search ....................... 395/50, 51, 52, 55, 395/63, 934

[56] References Cited

U.S. PATENT DOCUMENTS 4,370,707 1/1983 Phillips et al. ...................... 364/200

OTHER PUBLICATIONS

Introduction to Integrated Circuits; by Grinich et al.; McGraw-Hill; 1975; Table of Contents.
Lexis Handbook; 1980 (pp. 20–23).
Steven Evans, The Structure of Instructional Knowledge An Operational Model, Instructional Science 2, 1974, 421–450.
Newell, A. and H. Simon, Human Problem Solving, Prentice-Hall, Inc., 1972.
Steven Evans, Automated Curriculum Construction Toward Computer Constructed Education, Simulation & Games, vol. 7, No. 4 Dec. 1976, 363–388.
Steven Evans, The COMA System: An Inquiry/Answer On-Line System as the Basis for a Network-wide Redistribution of Health Sciences Instruction, Proceedings of the Third Annual Symposium . . ., Washington, D.C., 1979, 198–202.
Steven Evans, A Multi-Functional Health Sciences Instructional Consultant System, The Proceedings of the 14th International Conference in Systems Science, Hawaii, 1981, 819–827.
Steven Evans, The Redistribution of Education: Computer Constructed Education as an Educational Equalizer, Educational Technology, 14:8, 43–45, 1974.

(List continued on next page.)

*Primary Examiner*—Allen R. MacDonald
*Attorney, Agent, or Firm*—Cushman, Darby & Cushman

[57] ABSTRACT

A method of interpreting a problem statement and providing goals for solving the problem includes storing in electronic memory a plurality of goal statements, each indicating the educational purpose of a subject matter area;

forming in electronic memory a semantic network by storing a plurality of key words associated with each of the goal statements; the goal statement address of each of said key words, a list of any synonyms for each of said key words, a list of any terms generic to each of said key words, and a list of any terms which are a species of said key words, each key word being given a specific address location, each of said key words, synonyms, generic and species terms being thereby interlinked to one another and to each goal statement associated therewith and for each goal statement, each key word thereof being linked to the corresponding key word in memory and to its synonyms, generic and species terms. In operation a problem statement is entered from which the key words of said statement are determined. The goal statements linked to each key word and its asssociated synonyms, generic and species terms are then located. A variety of selected information is also located, for each goal, that was linked to that goal or that was linked to key words associated to that goal.

2 Claims, 10 Drawing Sheets

OTHER PUBLICATIONS

Evans, "Implementation of a Computer-Based Test Generator To Evaluate Health Professions Continuing Education", Proceedings of the First Annual Conference American Association of Medical Systems and Informatics, vol. 1, Oct. 27-30, 1982 pp. 144-147.

Summary of Ranking Continua, 1 page only.

Ryan, "Applications of a Nursing Knowledge Based System for Nursing Practice: Inservice, Continuing Education, and Standards of Care", Proceedings of the Seventh Annual Symposium on Computer Applications in Medical Care, Oct. 1983 four pages.

Evans, "The Total-System Design of Instruction: A Project Overview" Instructional Science Research, Creighton University, 1981, pp. 1-16.

Evans, "The Structure of Instructional Knowledge: An Operational Model", Graduate School fo Industrial Administration, 1974, pp. 421-450.

Evans, "A Computer-Based Nursing Practice Protocol Writer", Proceedings of the Seventeenth Hawaii International Conference on Systems Science, Jan. 1984 six pages.

Knuth, "The Art of Computer Programming", vol. 1 of Fundamental Algorithms five pages.

Knuth, "The Art of Computer Programming", vol. 3 of Sorting and Searching, six pages.

Fig. 7. MORE SPECIFIC SEARCH ROUTINE OF FIG. 4

Fig. 10.
EVALUATION CONSULTANT

```
┌─────────────────────────────────────────┐
│ USER IDENTIFIES A GOAL STATEMENT        │
│ OF INTEREST BY ENTERING NUMBER          │
│ THEREOF FROM SEARCH ROUTINE             │
│ OF FIG. 4.                              │
└─────────────────────────────────────────┘
                    │
                    ▼
┌─────────────────────────────────────────┐
│ FIND GOAL STATEMENT AND                 │
│ PRINT OUT                               │
└─────────────────────────────────────────┘
                    │
                    ▼
┌─────────────────────────────────────────┐
│ FIND SUBGOALS OF SUBGOALS TO            │
│ THE CONTENT GOAL STATEMENT              │
│ LEVEL                                   │
└─────────────────────────────────────────┘
                    │
                    ▼
┌─────────────────────────────────────────┐
│ FOR EACH PURPOSE STATEMENT              │
│ OF EACH CONTENT GOAL, ALTER             │
│ THE LEADING VERBS SO THAT A             │
│ TESTING QUESTION IS CONSTRUCTED         │
│ AND PRINT NEW PURPOSE STATEMENT         │
└─────────────────────────────────────────┘
```

INTERPRETATIVE SYSTEM FOR SYSTEMATIC LEARNING AND SUPPORT FOR DECISION-MAKING

This is a continuation of application Ser. No. 07/453,261, filed on Dec. 21, 1989, which was abandoned upon the filing hereof, which is a continuation of Ser. No. 07/361,768 filed May 30, 1989; which is a continuation of Ser. No. 07/135,466 filed Dec. 21, 1987; which is a continuation of Ser. No. 07/023,989 filed Mar. 12, 1987; which is a continuation of Ser. No. 06/643,548 filed Aug. 23, 1984 all abandoned.

BACKGROUND OF THE INVENTION

The present invention relates to a system for interpreting a stated problem and providing educational goals or objectives related to the problem as well as guidelines to support decision-making and tests for evaluation.

In the past computer assisted instruction (CAI) systems have been developed which present fixed material or data which is displayed on a screen or printed out. Typically such material is displayed on the screen or printed as a result of a direct request for such information. Other more advanced CAI systems flexibly respond to a user's reply and answers with data and follow-up questions presented on the display.

In the artificial intelligence field much work has been done in connection with the computer diagnosis of problems. Thus, for example, in the medical field an artificial intelligence system would receive as input, patient symptoms and based on this input, attempt to determine the underlying problem. Because these systems must reason about the problem and guess what kind of information is required to diagnose the underlying problem, these programs have been adapted to "teach" by explaining why it is providing certain answers or responses. These programs may also teach by comparing what a student suggests ought to be done with what the system calculates ought to be done. These systems can then try to describe to the learner any differences in choices based on a comparison between the student's suggested solution and the solution calculated by the computer.

None of these systems, however, provides the capability of actually simulating a knowledgeable instructor which can interpret a problem and determine what information or subject matter area a user needs to master. It accordingly is an object of the present invention to provide an improved system for enhancing and directing students or users in the process of learning about any given subject matter area.

SHORT STATEMENT OF THE INVENTION

Accordingly, the present invention relates to a method and apparatus for interpreting a problem and providing goals for solving that given problem. The system includes the storing of a plurality of goal statements each indicating an educational purpose for a given subject matter area. Each of the goal statements are set up so that they are linked to associated key words in a key word list. Thus, each of the key words in the list is linked to at least one and typically many different goal statements. A list of synonyms for each key word together with a list of words which are generic categories to each key word and a list of words which are species of the key word are formed in a list and linked to the associated key word to form a semantic network.

In operation when a problem statement is entered into the computer, the computer first determines what words of the goal statement are key words. A sub-routine then selects in a predetermined fashion those stored goal statements which include the key word. If there are more than one key word in an input problem statement, the system determines whether the words are connected by an "and" function, an "or" function or an "in the context of" function. If two or more words are connected by an "or" function, all stored goal statements associated with each of the key words is retrieved and displayed. If two or more key words are joined by an "and" function, the goal statements corresponding to each key word are ANDed such that only those goal statements which have both key words therein are displayed. In either case, goal statements containing the synonyms, generic and species words of the key words are also retrieved and displayed. If two or more key words in the problem statement are linked by the function "in the context of", goal statement containing words which are synonyms of the synonyms of key words are searched and retrieved together with those goal statements which contain words which are generic and species of the synonym and the synonyms of synonyms of the key word.

The system ranks the goal statement as being most relevant, next most relevant, etc. Thus, if two or more key words are found in an entered problem statement, a list of goal statement pertaining to each key word will be derived. The system will then compare the two sets of goal statements to determine whether any goal statement included both key words therein. If so, these goal statements are listed as most relevant. The system will then look to determine whether any goal statements were found which are based upon synonyms of the key word. These goal statements are listed as very relevant and placed in the second tier.

Next the system looks to determine whether any goal statements are listed based upon key words therein which are species of the key word in the problem statement. Such goal statements are defined as somewhat relevant and, finally, the system determines if any goal statements were derived based on terms which are generic to the key words in the input problem statement. It is required that a recommended goal statement contain all of the terms the user provided otherwise no particular goal statement is considered appropriate. If the system is unsuccessful, then it requests further information in the input problem statement.

The system can liberalize the search for goal statements by modifying the imput key words and/or by modifyinig the connectors between key words and/or by limiting consideration to only a predetermined number of key words. This is done on an automatic basis when goal statements are not found pursuant to a normal search.

Of course, as desired prerequisites of goal statements, subgoals of goal statements and other information can be retrieved by the user.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

The preferred embodiment of applicant's invention is in the form of a process operable only in a computer or electronic data processing system. The system is based upon the storage of certain groups of educational messages termed goal statements or simply "goals" which contain information about a given subject. The system provides a systematic way to access each of the goals when a specific problem statement has been entered into the computer by a user. Accordingly, at the outset in order to provide a clear understanding of the method of the present invention, the required data base will first be described.

The primary unit of information in the data base is the goal statement. The goal statement is a combination of the title of a purpose statement, the purpose or educational goal to be achieved with respect to the subject matter, together with a fixed information portion called the vector. The vector is a shorthand way of expressing important aspects of the goal statement and includes five parts.

Figure 1:
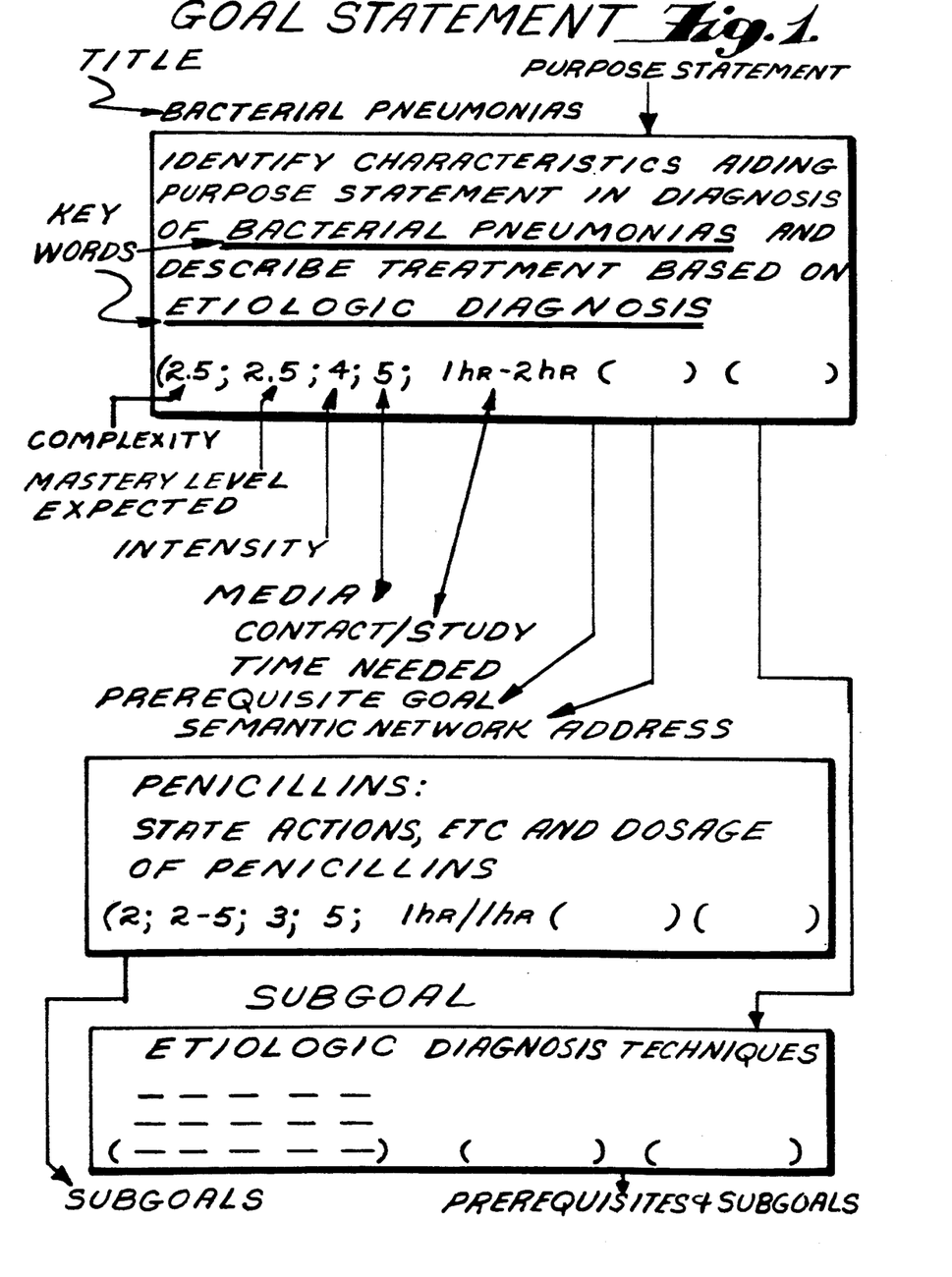
FIG. 1 is an illustration of an example of a goal statement.

As indicated in FIG. 1, the complexity number is an indication of the "complexity", that is, degree of superficiality or depth of the presentation of the subject matter on a scale of one to seven. The number 1 refers to merely an overview and the number 7 refers to all that could be known about the subject. The term "mastery" expresses the level of mastery which the student is to attain, that is, an indication of the performance to be expected when the student is tested for achievement of the goal. For example, 2.5 is the ability to "recall" the information while 4 is the ability to apply the information to solve a problem.

The term "intensity" expresses the relative demand on the student in terms of concentration and initiative. The more well-structured and complete the information presentation, the lower will be the demands or intensity upon the student.

The term "media" indicates the media to be used in conveying the instruction to the student. Media choices are abbreviated with capital letters. Thus the letter "S" means the media will be "specified later". The letter "P" stands for "packaged learning", the letter "C" for "clinical practice", etc.

Finally, the term "time" is in two parts. The first part is that time which the student needs to be in contact with the instructional media, such as, lecture time. The second time is the student's study or practice time. These vectors act as constraint levels such that if the student is looking for an educational goal but only up to a complexity level of 2, the more complex goal statements (i.e., 3 or more) will not be recalled from memory.

Also associated with a goal are addresses for the sub-goal. Sub-goals are goal statements that specify what must be accomplished in order to satisfy the goal statement. There are, in effect, species of the original goal, that is, they are more specific to problems which form a part of the goal statement. Each sub-goal may, in turn, have further sub-goals. The sub-goal list address is a pointer to a list of addresses of sub-goals for a given goal.

The goal data also includes a prerequisite list address. A prerequisite is a goal statement of what the user should accomplish and master before attempting to undertake a specific goal designated by the system. A prerequisite list address is a pointer to a list of addresses of prerequisite goals.

The goal also has associated with it a semantic summary address. The semantic summary includes the key words associated with each particular goal statement and includes generic, synonyms and species words associated with each key word. Finally, associated with a goal is a prerequisite back list address which is pointer to a list of addresses which point to goal statements which are statements for which a given goal statement is a prerequisite. As aforementioned, the goal statement with its associated pointer lists is one of the key elements of the data base of the present system.

Figure 2:
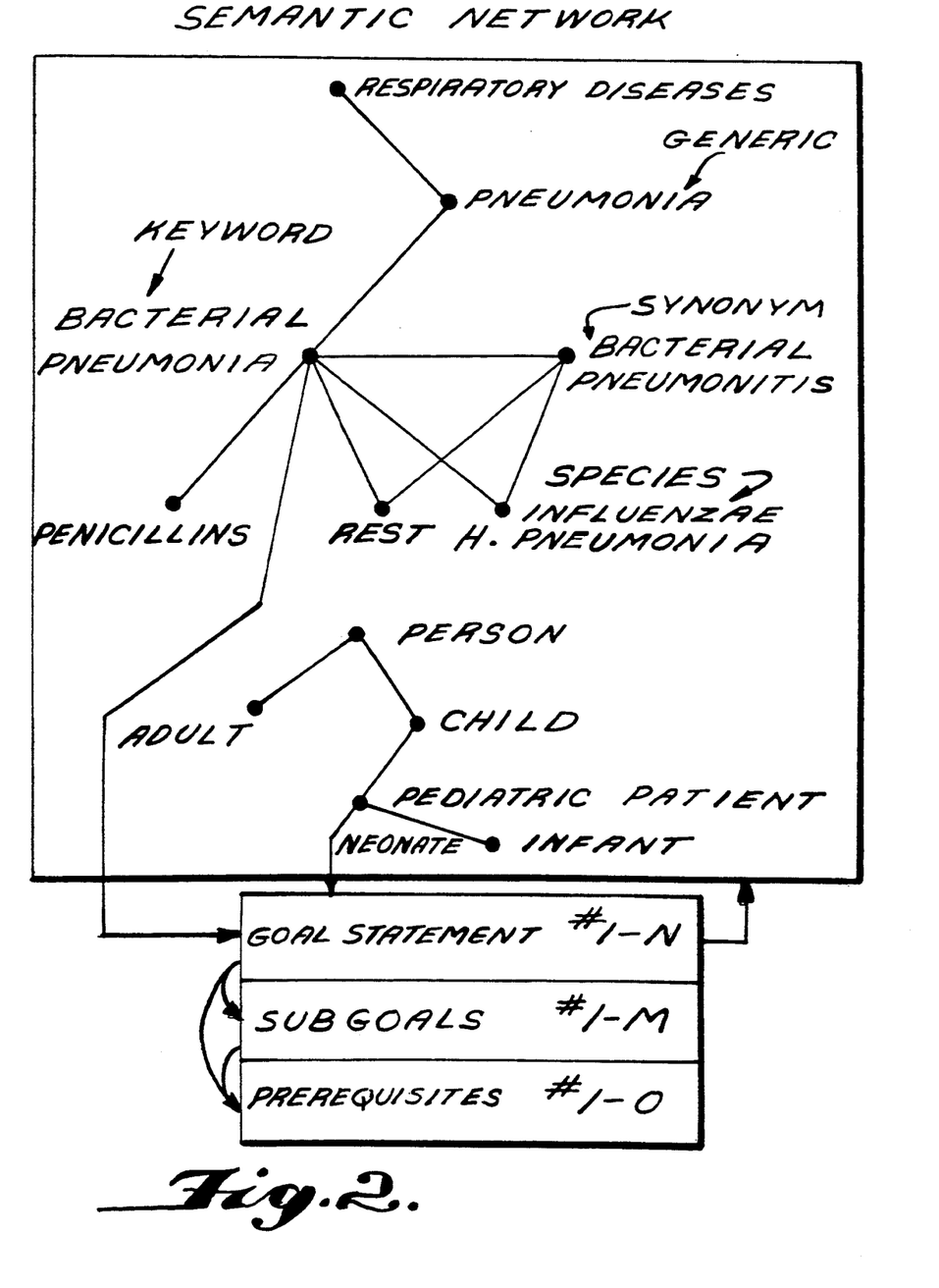
FIG. 2 is an illustration of an example of the semantic network.

The second part of the data base is a semantic network of terms and concepts and includes all of the key words that are associated with each of the particular goal statements stored in memory. The key words together with synonyms thereof as well as terms that are generic and terms which are species of the key words are stored in a dictionary file. Thus, for example, with respect to FIG. 1, one key word would be "bacterial pneumonia". Another key word would be "etiologic diagnosis". Taking the key word "bacterial pneumonia", a generic word would be "pneumonia". A key word which would be generic to "pneumonias" would be "respiratory diseases". A synonym for bacterial pneumonia would be, for example, "bacterial pneumonitis". As a species of the key word bacterial pneumonia there are a number of terms such as "H. influenzae pneumonia". These key words and associated generic terms, synonyms and species terms are related to one another by an expert in the field who inputs data into the semantic network data base. A typical semantic network is illustrated in FIG. 2 with each dot location indicating a term at a level in the semantic network. Those dots above any given dot are generic to the terms represented by the dots therebelow. Dots at the same level represent synonyms and dots below any given dot and illustrated as being linked thereto are species of the dot above. Of course, in practice the linkage is by means of address pointers and every dot can have innumerable points above, even, and below it as would be appreciated by those skilled in the art. The format of the key word dictionary is that each key word has an associated goal address for each goal statement having the key word therein. In addition, each key word has a generic area list address of terms which are generic thereto. Each key word further has a synonym list address and a species term list address so that each of the generic, synonym, and species terms are linked to the key word together with the goal statement containing a key word.

Thus the dictionary combines all generic, synonym, and specie entries for a word, giving the system unified and integrative knowledge about the world in a combined manner. Moreover, each goal itself points to its own key words with the generic, synonym, and specie entries appropriate for just that one goal. This gives the system detailed local knowledge about one area which it uses when it identifies a specific goal as pertinent to the user's interest.

As illustrated in FIG. 2, the key word "bacterial pneumonia" is linked to the goal statement "provide care for neonates with bacterial pneumonia" because the term bacterial pneumonia appears in the goal statement and is a key word. Now, of course, for the term "bacterial pneumonia" other goal statements would be called up as will be explained below based upon terms which are found in the synonym, generic and species address list. As also will be explained below, if it is desired to determine what areas the user must be knowledgeable about in order to accomplish the goal of providing care for neonates with bacterial pneumonia, a prerequisite list of goals can be obtained. As an example, such a list would include goals about penicillins and their action and, in turn, each prerequisite goal could have further prerequisites such as chemical structures of penicillins.

The third part of the data base is a bibliographic reference to specific learning materials for the lowest level subgoal called for a content subgoal for any given goal statement. Thus when the materials identified by the bibliographic reference have been mastered by the user for a goal's content subgoals, the next higher level (the goal itself) is, in effect, achieved. It should be understood that the actual books or articles identified by the bibliographic reference are not part of the data base or part of the present system, but rather only the citations form a part thereof; it being borne in mind that the object of this system is to direct the user along a course of study which will result in achieving the input problem statement.

Turning now to the operating system of the present invention, the intelligence of the system resides in the manner in which the system understands and interprets the user's problem statement and relates this understanding and interpretation to retrieval in its data base. Given any problem statement, for example "chronic emphysema and patient rehabilitation techniques" the system will go, in a manner explained below, to the semantic network to interpret this problem statement. This system will first attempt to determine if any one goal is in the data base having each of the key words provided in the problem statement. Thus by looking into the semantic network, all goal statements which are directly linked to the key words can be retrieved and displayed. If, for example, one group of goal statements using the first phrase or key word, i.e. "chronic emphysema" is found, and another group of goal statements using the second term, i.e. "patient rehabilitation techniques", is found the system compares the two lists to see if any one goal uses both terms. If so, the identified goal or goal are listed as most relevant. That is, they are placed in tier 1. If such a goal statement does not exist in the data base, the system will then look to the semantic network for all words which are synonyms of the words used, for example, "rehabilitation approaches". If there are any goal statements linked to the synonyms, such goals are listed as very relevant and are provided on tier 2 in the output display. Again if no such goals are found in the data base, the system then looks to species terms of the key word term "patient rehabilitation techniques". If any goal statement is found in the data base which uses the species terms, such goal statements are displayed and labelled as somewhat relevant, that is tier 3. An example of a subgoal term might be "breathing retraining techniques".

Finally, the system will check to determine if terms generic to the key word are found in a goal statement. Because these more generic terms are broader and more amorphous than the terms employed by the system user, the goal statements found in the data base are labelled only as probably relevant, that is tier 4. If no goal statement is found which contains all the terms or synonyms, generic terms or species terms of those provided by the user in the input problem statement, no one goal statement is considered appropriate and follow-up requests for assistance is provided to the user. Thus the user is asked for terms which might be synonyms of the ones he originally used, and the user will be asked for terms which are either generic or species to the terms used in the original problem statement. The system then repeats its efforts with this additional information.

Figure 3:
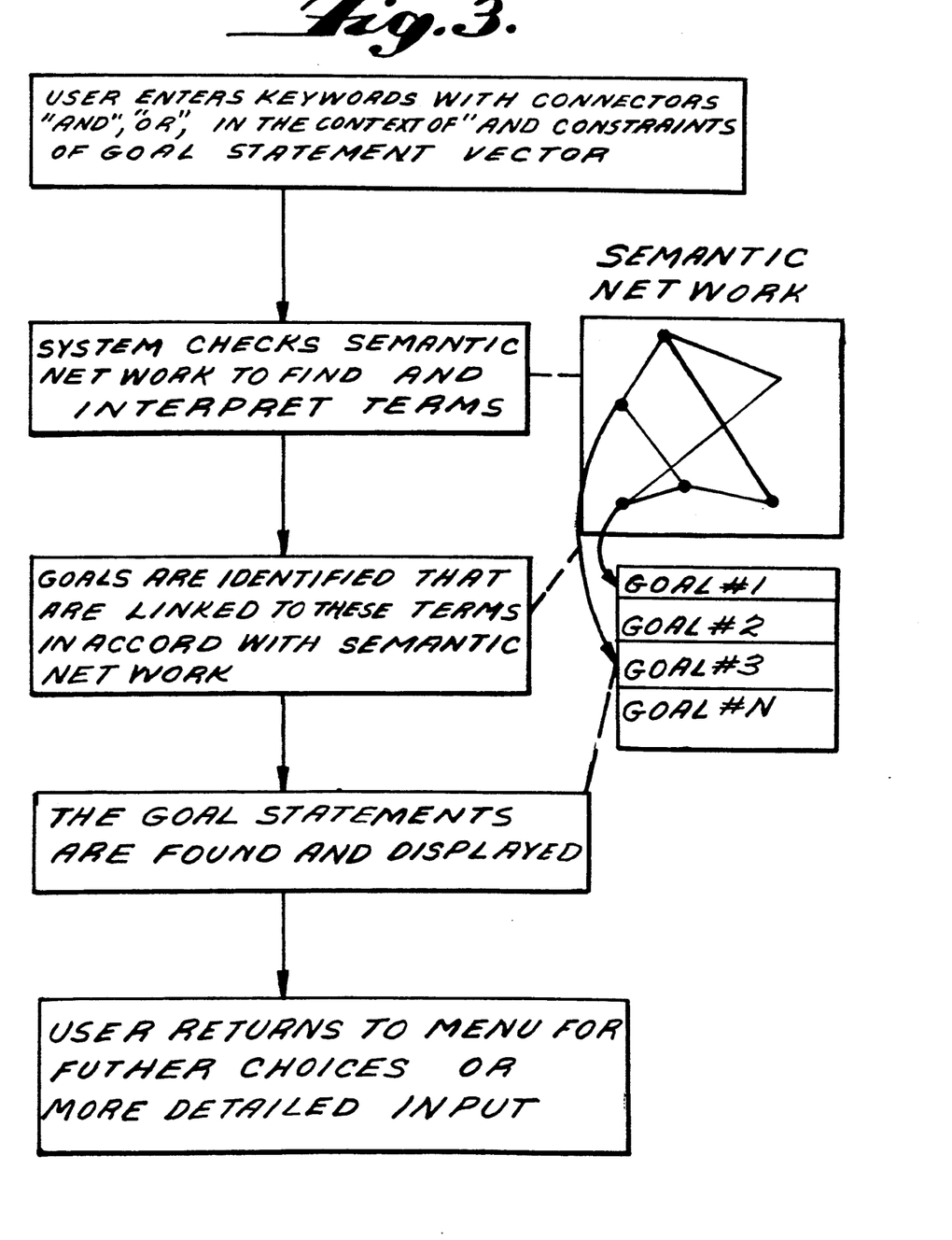
FIG. 3 is a general functional flow diagram of the search routine of the present invention.

Turn now to FIG. 3 which is a generalized functional diagram of the system for determining the goal statements relating to a particular input problem statement. The user first enters the input problem statement together with the appropriate connectors "and", 37 or", and "in context of". The system will then access the semantic network to find and interpret these terms as aforementioned. Thus assuming there are two key words in the problem statement, those goal statements associated with key word 1 are accessed and brought out to an area of memory and placed on a first list. Those goal statements associated with key word 2 are brought out to a second list in memory. As aforementioned each of the goal statements may be based upon the key words themselves or upon synonyms, etc. These goal statements are combined by determining the appropriate connector, that is "and", "or" or "in context of". Those goal statements which satisfy the aforementioned functions are then displayed to the user. At this point the user can accept the goal statements and associated information or, in the alternative, may return to the system menu for further choices or for inputting further and more detailed information regarding the problem statement.

Figure 4:
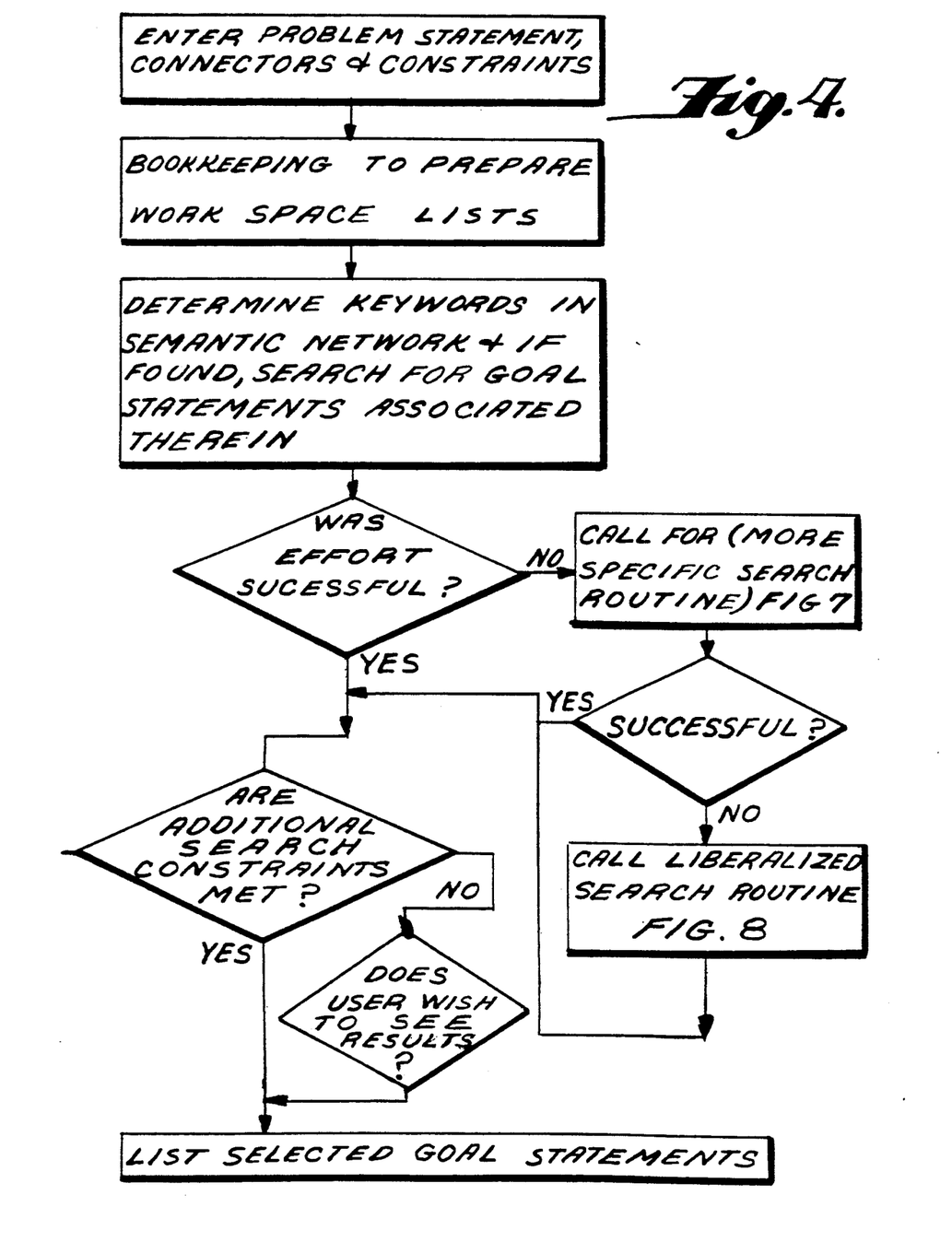
FIG. 4 is a more detailed flow diagram of the search routine of the present invention.

Refer now to FIG. 4 which is a more detailed flow diagram of the goal search routine for the system. Initially the problem statement is inputed by the user together with any constraints placed thereon. For example, the user might enter vector contraints. As aforementioned, with each goal statement there are a list of numbers and a letter associated with each goal statement termed the vector. Among these are numbers and letters identifying the desired complexity for a problem area, the intensity desired by the student, the time to be invested and the mastery level required. If the user wishes to place some restraint on the goal statements called up from the data base, in the input statement a vector constraint is entered. For example, the complexity may be limited to no higher than, for example, a level of 2.5. Thus any goal statement having a complexity level greater than 2.5 would not be retrieved from the data base. In practice in the preferred embodiment, if a level of complexity of, for example, 2.5 is entered in the input problem statement, the system will automatically limit the goal statements retrieved from the data base to those having a complexity level of plus or minus ½ unit added or subtracted from the original constraint, that is, those goal statements having a complexity level of 2.0 up to 3.0 will be retrieved from memory. If, on the otherhand, the system requested a given time constraint, the system would compute the time constraints to be plus or minus 25% of the entered constraint. If, for example, the entered time constraint was 2 hours of contact time with the instructional media only those goal statements which require 1½ to 2½ hours of contact time would be retrieved from the data base. After the input problem together with contraints has been entered, the system will then prepare a space in memory for temporarily storing the retrieved goal statements.

Figure 5:
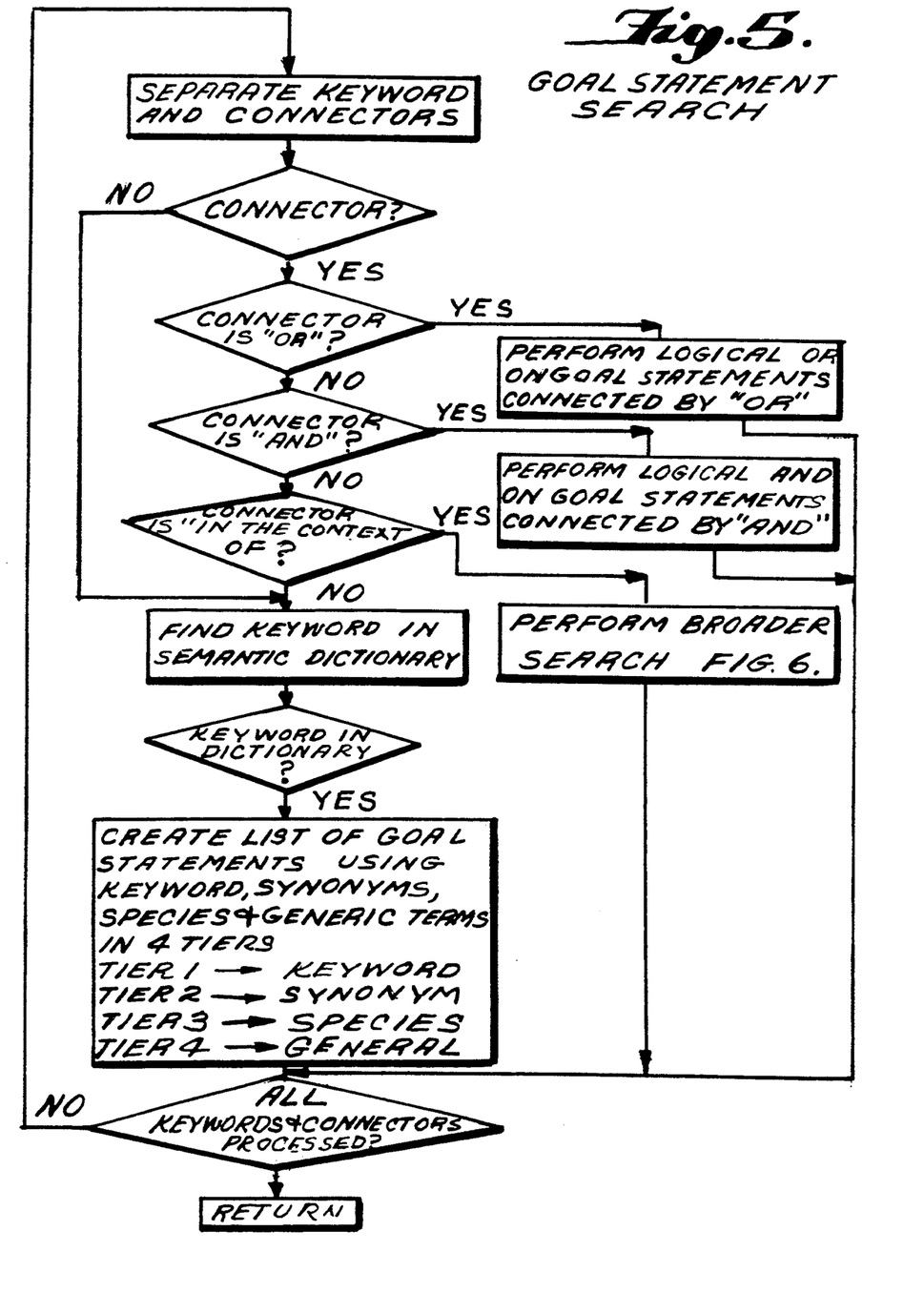
FIG. 5 is a flow diagram of the routine for the goal statement search of the present invention.

Next, the system will perform the necessary operations to find the goal statements that satisfy a particular search request using the key words and connectors in the input problem statement. This semantic search routine is illustrated by way of flow diagram in greater detail in FIG. 5. Initially, a key word and any connector following the key word is isolated and compared with the words in the key word dictionary. Then for each key word located in the key word dictionary which is associated with the given input key word, a semantic level search is conducted to find those goal statements associated with the key word, its synonyms, species terms and generic terms and ranks these goals statements into tiers of 1, 2, 3 or 4, depending upon whether the goal statement contains the key word itself, its synonym, the species term or the generic term, respectively. These goal statements are put into a list in the memory buffer. Then the next key word is processed in a similar manner until all goal statements for each key word have been retrieved. If there is a connector such as, for example, an "or" connector, a logical "or" function is performed on the goal statements in the separate lists for each key word, its synonyms, etc. in the buffer memory. If the connector is an "and" function, a logical "and" function is performed on the goal statements in the separate lists in the buffer memory. That is, those goal statements are searched which include the key words joined by the term "and". The goals that qualify are then made available for presentation to the user. Finally, if the connector is an "in the context of" connector, a broader list of possible key words is developed by the system by means of a context level search illustrated in FIG. 6. For the case of "key word A in the context of key word B," the usual four-tiers are developed for Keyword A which comprises goals which use the key word, synonyms of the key word, species, and generic terms of the key word. Then the key word B listed in the problem statement is found in the semantic dictionary and this term is saved in a buffer memory. Next the synonym list address of the key word is determined, and if there are any synonyms of the key word, they are also placed in the buffer memory. Then for each synonym word in the temporary buffer memory, the synonym list address is retrieved and added to the temporary memory list. The temporary memory list now holds the key words, its synonyms and the synonyms of the synonyms. Next for each word in the temporary memory the goal statement list address is retrieved and the goal statements are called from memory into a first list in temporary memory. These goal statements are identified as a first tier level. Next the level is set to 2 and for each word in a temporary memory including the key word, its synonyms and the synonyms thereof, the species list address is obtained. The goal statement for each such species term is then located and added to the list of goal statements stored in memory. Each of these goal statements are identified by level 2 or tier 2. Next the level is set to 3 and for each word in the temporary memory, words which are species of the species terms are retrieved and their associated goal statements are retrieved and temporarily stored. These goal statements are identified as tier 3 goal statements. Finally the level is set to 4 and the system will retrieve terms which are generic to the key word, its synonyms and synonyms thereof. The associated goal statements are then retrieved and temporarily stored in memory, and designated as tier 4 goal statements.

Figure 6:
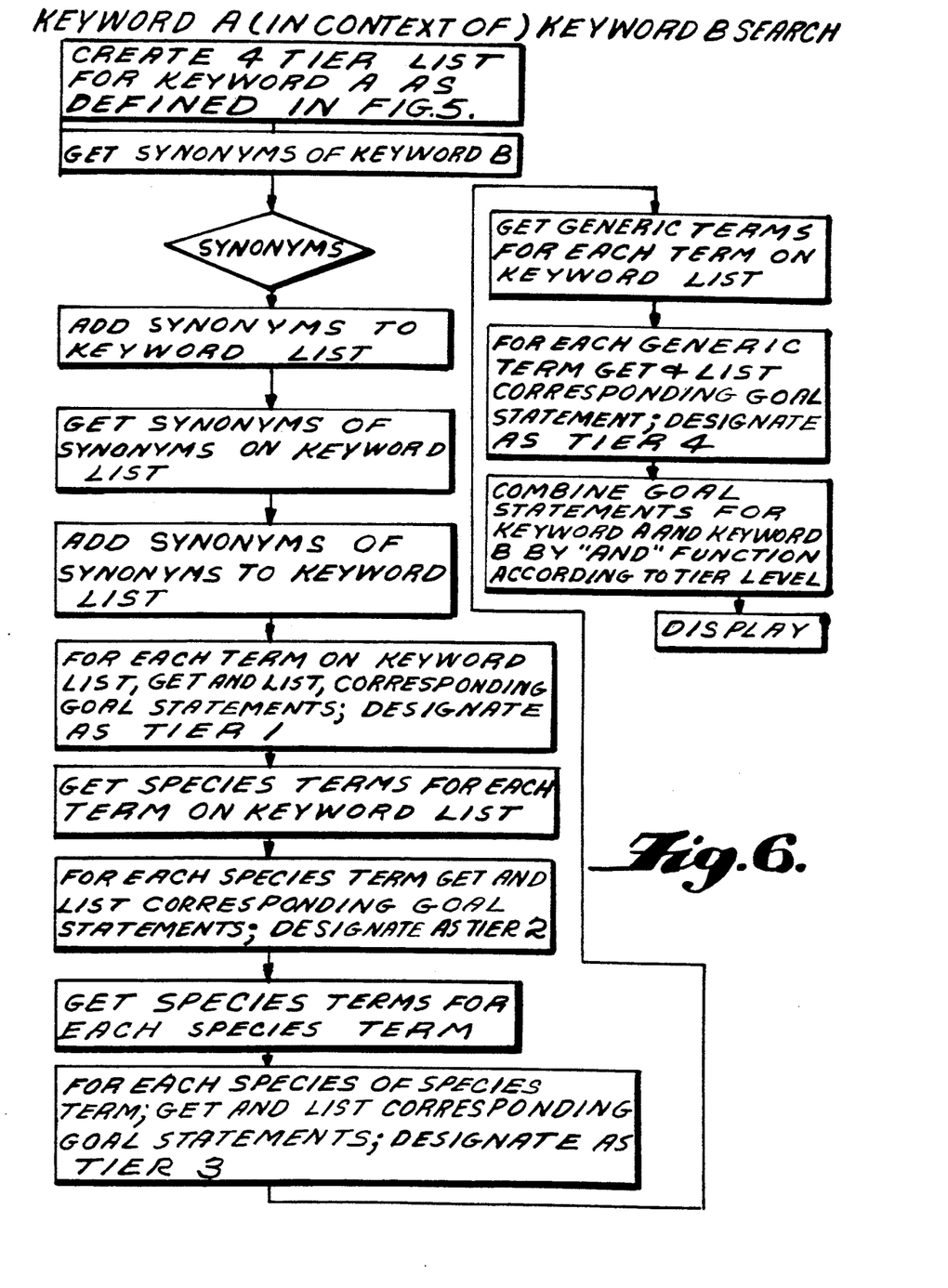
FIG. 6 is a flow diagram of the "In the Context of" search of the preferred embodiment of the present invention.

Next, the system takes the list of goal statements, including those related to the key word A as well as those for key work B generated by the broad search for synonyms and synonyms thereof and the two lists are ANDed according to tier level and any goal statements qualifying as aforementioned, are displayed.

After a search with any of the connector types has been completed a determination is made as to whether the search effort was successful in retrieving goal statements related to the solution of the problem presented by the user. If the goal statement search was successful, the system will then determine whether there are any additional search constraints desired. If there are any constraints entered, the constraint search routine will compare the constraints to the values in the vector of the goal statement and keep only those goal statements which meet the constraints.

When this is completed and if there are goal statements which meet the constraints identified by the user, the goal statements are presented by display or printed for the user. However, if the constraints are not met an inquiry is then made as to whether or not the user wishes to see the results even if the additional constraints are not met. If the user indicates yes, the goal statements are displayed. If not, the system returns to the menu for further choices by the user.

Figure 7:
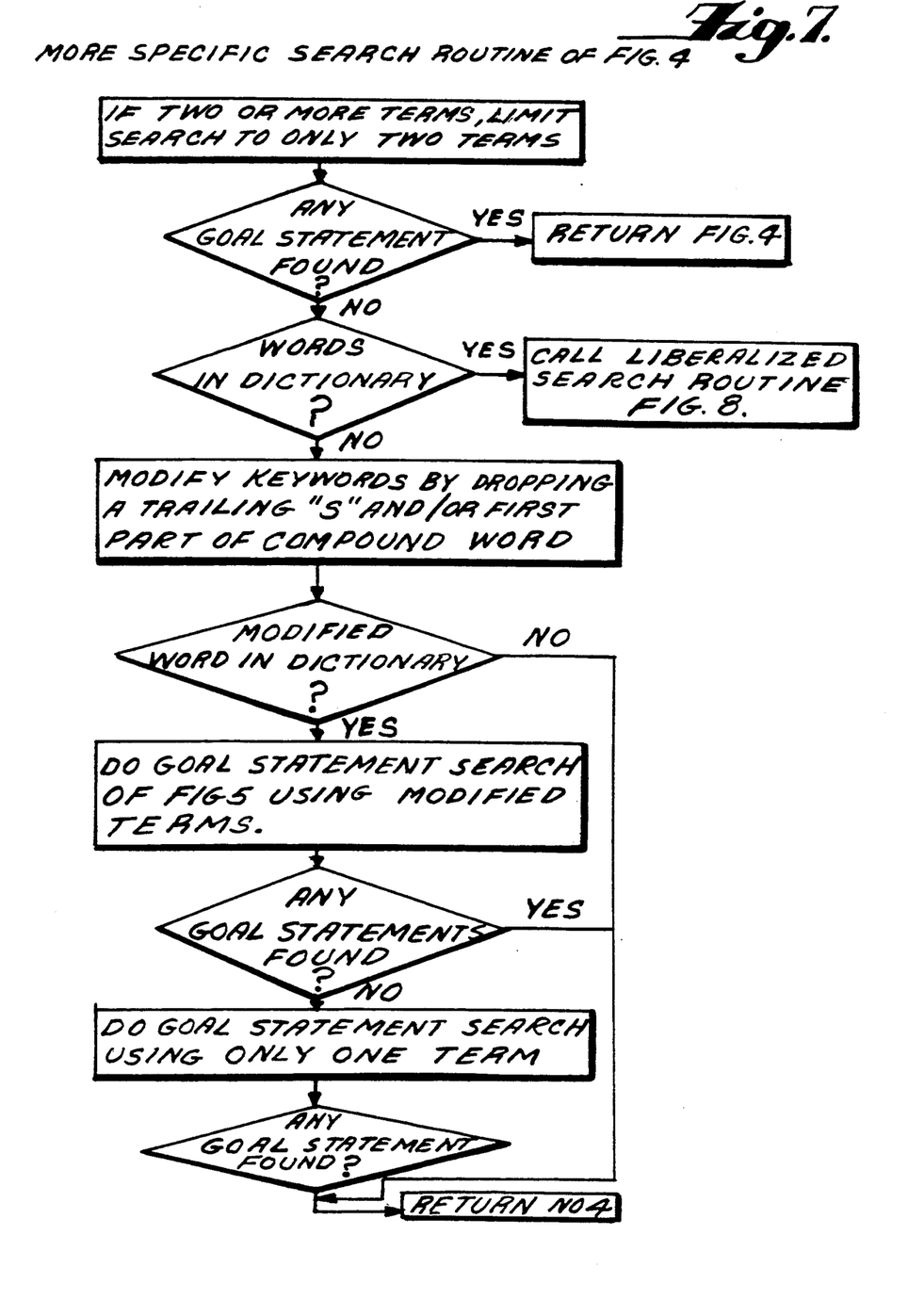
FIG. 7 is a flow diagram of the more specific search routine of FIG. 4.

If a search effort was not successful, a more specific search effort is instituted. Thus as illustrated in FIG. 7, if the user has entered two or more key words, the system will automatically limit the search to just the first two terms. If the search for just the first two terms produces goal statements, the system then returns to inquire whether additional search constraints from the user have been met as per FIG. 4). If no goal statements are recovered, then the system determines whether the first two terms are in the semantic dictionary. If so, the system goes to a liberalized search routine which will be explained below. If the terms are not in the dictionary, then the system will attempt to modify the input terms by dropping if possible a trailing "S" (since it checks for a plural form of the word which is a problem since there are no plural forms in the master dictionary) and/or the first part of a compound word (e.g., acute pneumonia) to determine whether a word can be found which is in the dictionary. If this is not successful in locating a word in the dictionary, the system returns. If it is successful in finding a modified word, a search using the modified terms or words is conducted. If any goal statements are uncovered, the user is notified. If, on the otherhand, the system is unsuccessful in finding a goal statement, then the system automatically goes to a search using only one of the input terms and if successful in identifying goal statements, they are displayed. Otherwise the user is notified and the system is returned.

Figure 8:
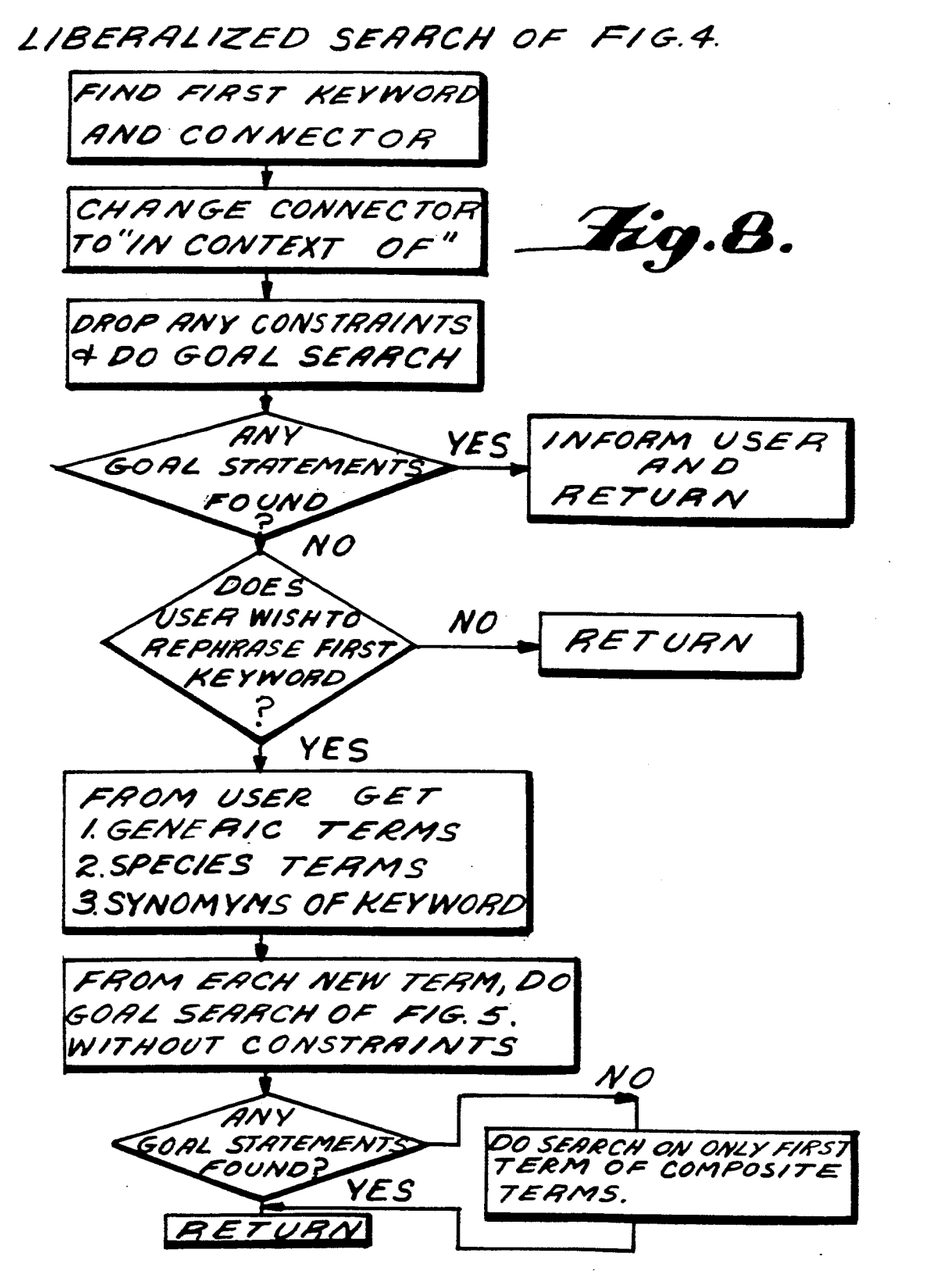
FIG. 8 is a flow diagram of the liberalized search routine of FIG. 4.

As aforementioned, if the first two key words or terms are located in the dictionary but no goal statements are located which use these terms, a liberalized search routine is initiated. In this more specific search routine, the first key word is "liberalized" as indicated in FIG. 8. In this routine the first key word of the input statement is located and if there is any connector related thereto, it is converted to the "in the context of" connector. This, of course, has the effect of liberalizing the search. The system will then drop any constraints the user may have entered and perform another specific search. If the system is successful in locating goal statements pursuant to the liberalized search, the results are displayed to the user. If not, the user is asked to rephrase the first key word. To assist the user, the system will ask for words which are generic to the key word, words which are species of the key word and words which are synonyms or the key words. These words are all stored in a buffer exchange memory. These terms are all ORed together and the aforementioned liberalized search is conducted with respect to the rephrased terms. Any goal statements retrieved are then placed on lists which are ORed together. Next an AND function in accordance with the second key word is performed. If no goal statements are located which satisfy the AND function, the user is asked if he wishes to see the results of the rephrased term search. If goal statements are found after the AND function, then of course the user is notified and the results displayed.

Assume now that the user has one or more goal statements based upon the aforementioned search routine. The user can then, if desired, obtain the prerequisites and subgoals for each goal statement. Thus a routine is provided which finds the parents, grandparents, etc., of a goal statement and prints out the prerequisites for these goal statements plus the prerequisites for the goal statement itself. By this routine, a request is first made for the goal statement numbers from the user. For each goal statement entered, the system will then locate the goal statement in the data base. The goal statement is then printed out. Then a search for a higher parent or generic level goal statement is made. This goal statement is added to a stack of other generic or parent goal statements. For each generic or parent goal statement uncovered, a determination is made as to whether or not there are any prerequisite goal statements. If there are prerequisite goal statements, then the prerequisites and the prerequisites of the prerequisite goal statements are printed or displayed. If the user requests subgoals, more specific statement goals will be generated in addition.

If it is desired to have a complete description of a goal statement, the user will input a goal statement number and for each number entered the system will print the goal information, the semantic summary therefor and one generation of prerequisites and subgoal or species goals. This routine operates in response to an input goal statement number by first printing the goal statement together with the citation and the semantic summary for the goal. This is done by printing the key word of the goal statement together with the key words, generic terms, synonyms, and species terms. Then the prerequisites for each goal statement is determined and printed out. Next the subgoal or species goals are located and printed out. This information gives the user further information as to a field of search for any given goal statement.

Figure 9:
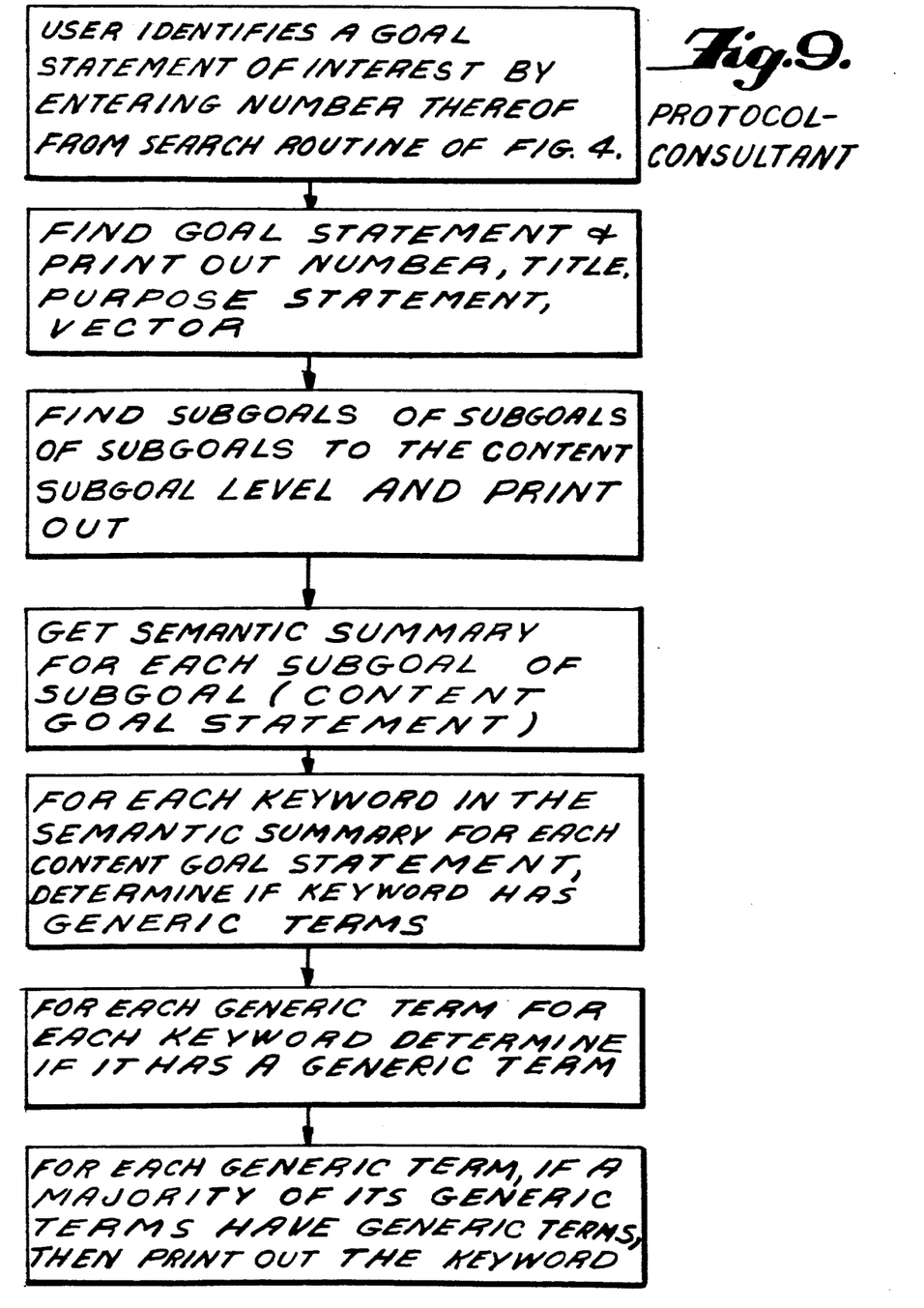
FIG. 9 is a flow diagram of the protocal consultant of the present invention.

It may be desired that the user wishes to have a protocol for decision-making in connection with a specific goal statement. For example, if the goal statement is to "provide proper techniques of rehabilitation for the emphysema patient" it may be desired to have a specific method or protocol to follow in accordance with rehabilitation of the patient. As illustrated in FIG. 9 the system will first go to the goal statement in the data base and from that find the lowest level species goals or subgoals which give the most concrete information. The subgoals of subgoals to whatever depth is needed are located by first extracting the subgoal list address for each goal statement and then for each subgoal find the subgoals of the subgoals. If there are no subgoals of the subgoals, the first level of subgoals will be considered to be the content goals. Otherwise the second or Nth level of subgoal will be termed the content goals. For each content goal, the content goal statement is printed and a semantic summary list address is obtained. For each key word in a semantic summary for the content subgoal, a check of the generic terms and a printout of the synonym and subareas or species for the key word is performed. In performing this process, a check is made to determine if a majority of the generic areas have, in turn, areas generic to themselves. If a majority do have generic areas, the subareas or species terms of the key words are printed. If, however, a majority of the general or generic areas do not have in turn more general or more generic terms, then the species of the key word is not printed because the species word will be considered to be too general, i.e. not a content statement. Thus the important key words are determined by using the rule that an important key word must have at least one general term provided and one species term together with a condition that two-thirds of the general or generic terms must in turn have generic terms. This operates essentially as a filter to eliminate words which are too arcane or too general and thus not lend themselves to taxonomic classification. Thus it identifies key words which are basic or detailed because each key word has both a general area and a general area of that general area. Thus a term such as "health" or "medicine" which would ordinarly not have general areas much less areas general to that area is removed from consideration. Thus the specie terms for the key words can be identified and displayed to the user for each content subgoal. These specie terms for key words for content subgoals identify the range of choices a professional has regarding that key issue. For example, the specie list for the key word "physical reconditioning" which occurs in a content subgoal of the goal associated with "rehabilitation of the emphysema patient" includes the choices "breathing exercies", "pulmonary physiotherapy", "activity", "adaptation", "cough technique", and "postural drainage".

Figure 10:
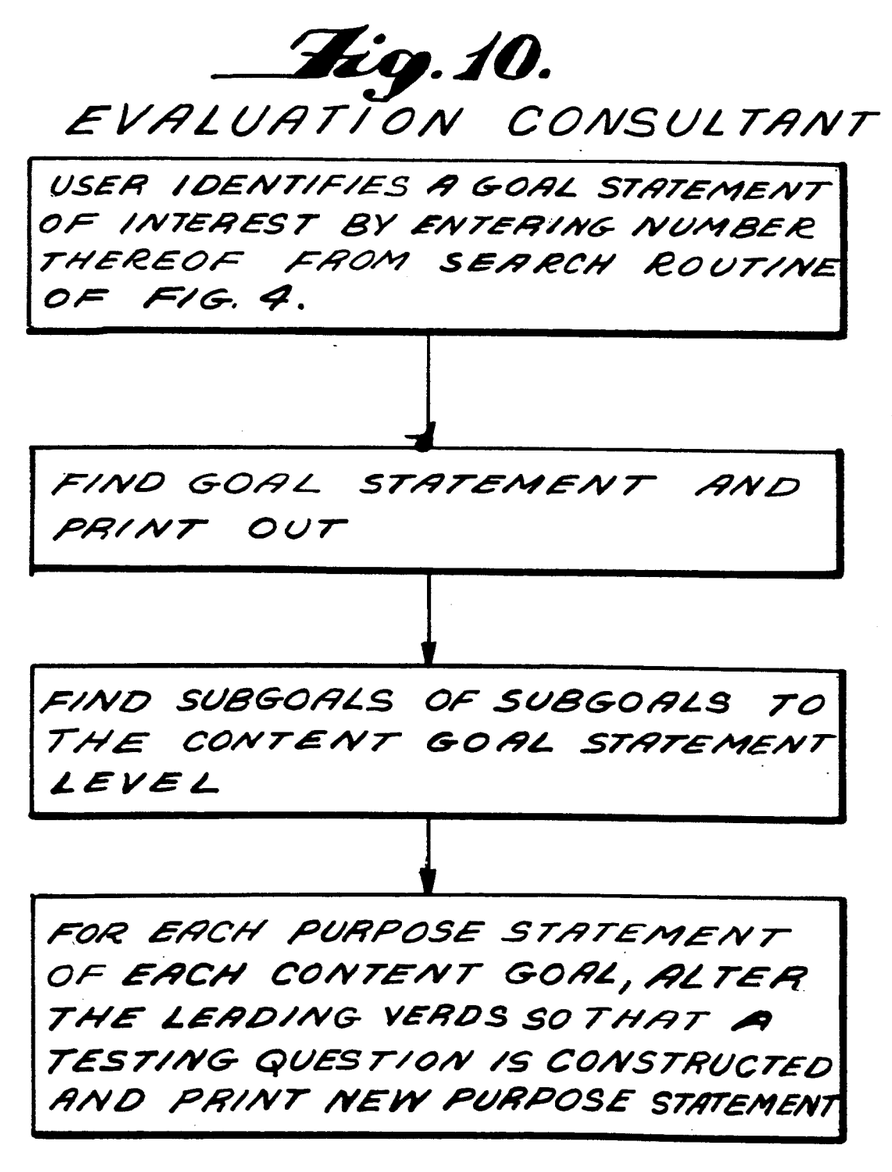
FIG. 10 is a flow diagram of the evaluation consultant of the present invention.

It may be desired now for the user to request an evaluation of his achievement of some goal. As shown in FIG. 10, the system retrieves the content subgoals for that goal and then alters the wording of each purpose statement to turn it into a question or testing requirement. This question set becomes a suitable self-test that is displayed to the user in order for him to evaluate how well he has mastered the materials. This testing option is embodied in a menu choice called the Evaluation consultant.

By the system of the present invention the educational goals which the system recommends to a user are selected dependent upon what is located within the data base forming the semantic network. As the semantic network is increased, additional links are made between key words and goal statements such that materials never conceived by the person inputting the data can be related to one another when using the system of the present invention. In this way the system causes the contributions of an expert in one particular field or area to have linked conceptually his input to another field in a manner that neither he nor the other experts inputting data were aware. As this is done the system can now link together and call upon related items because the heart of the selection process is within the semantic network structure. As an example, if certain ethical issues involving medicine are entered into the data base as goal statements and as key words, the ethical expert may link certain goal statements to the care of the terminally ill. When a problem statement is entered into the system by identifying elderly heart-stroke patients, the ethical goal statements would undoubtedly be uncovered because an elderly heart-stroke patient would be an area which is linked to the term "terminally ill" which in turn would be linked to the ethical goal statement. The first expert did not know his pertinent ethical material would be tied to the area nor did the second expert anticipate this material.

While the present invention has been disclosed in connection with the preferred embodiment thereof, it should be appreciated that other modifications and embodiments can be developed which fall within the spirit and scope of the invention as defined by the appended claims.

What is claimed is:

1. A method for interpreting a problem statement and providing goals for solving a problem in said problem statement comprising the steps of:

storing in electronic memory a plurality of goal statements, each indicating an educational purpose of a subject matter area;

identifying in each goal statement at least one subgoal statement address and/or prerequisite goal statement address;

forming in electronic memory a semantic network by storing a plurality of key words associated with each of said goal statement addresses; a goal statement address of each of said key words, a list of any synonyms for each of said key words, a list of any terms generic to each of said key words, and a list of any terms which are a species of said key words, each key word being given a specific address location, each of said key words, synonyms, generic and species terms being thereby interlinked to one another and to each goal statement associated therewith and being linked to a corresponding key word in memory and to its synonyms, generic and species terms;

inputting a problem statement;

determining key words of said input problem statement;

comparing said key words with said stored key words; and searching goal statements having said key words therein wherein said determining the key word step includes the steps of determining if a connector term connects two or more key words in the problem statement; and searching said goal statements in accordance with said connector terms further comprising the steps of:

applying constraints to said input problem statement to thereby limit the scope of goal statements listed; and wherein each of said goal statements includes a vector designating the constraint criteria for said goal statement wherein said constraints listed for each of said goal statements includes a designation of the level of complexity, the level of mastery of the subject matter required and the anticipated study time in order to master said subject matter to the degree indicated further comprising the steps of changing each connector to an "in the context of" function; and performing said search for goal statements containing said key words.

2. The method of claim 1 further comprising the steps of inserting in said vector for each of said goal statements the intensity level required for mastery of said goal statement and the media from which that goal statement is achieved.

* * * * *